United States Patent
Fraisse et al.

(10) Patent No.: US 10,747,929 B1
(45) Date of Patent: Aug. 18, 2020

(54) RESOLVING TIMING VIOLATIONS IN MULTI-DIE CIRCUIT DESIGNS

(71) Applicant: Xilinx, Inc., San Jose, CA (US)

(72) Inventors: Henri Fraisse, Sunnyvale, CA (US); Dinesh D. Gaitonde, Fremont, CA (US); Chirag Ravishankar, Erie, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/255,496

(22) Filed: Jan. 23, 2019

(51) Int. Cl.
| | |
|---|---|
| *G06F 30/30* | (2020.01) |
| *G06F 30/36* | (2020.01) |
| *G06F 30/398* | (2020.01) |
| *G06F 119/12* | (2020.01) |

(52) U.S. Cl.
CPC ............ *G06F 30/36* (2020.01); *G06F 30/398* (2020.01); *G06F 2119/12* (2020.01)

(58) Field of Classification Search
CPC ............................... G06F 30/36; G06F 30/398
USPC .................. 716/102, 104, 118, 126
See application file for complete search history.

(56) References Cited

U.S. PATENT DOCUMENTS

| | | | |
|---|---|---|---|
| 10,255,403 B1 * | 4/2019 | Saurabh et al. | .... G06F 30/3312 |
| 10,318,699 B1 * | 6/2019 | Sivaswanny et al. | ...................... G06F 30/3312 |
| 10,366,291 B2 * | 7/2019 | Nowak-Przygodz et al. | ............... G06F 16/5866 |
| 10,430,539 B1 * | 10/2019 | Dudha et al. | ......... G06F 30/392 |
| 10,452,452 B2 * | 10/2019 | Hetzel | ..................... G06F 15/78 |
| 2005/0251779 A1 * | 11/2005 | Chard et al. | ............ G06F 30/33 716/108 |
| 2017/0061067 A1 * | 3/2017 | Gregerson et al. | ... G06F 30/394 |

OTHER PUBLICATIONS

Specification and drawings for U.S. Appl. No. 15/991,791, filed May 29, 2018, Fraisse et al.
Fraisse, Henri et al., "A SAT-Based Timing Driven Place and Route Flow for Critical Soft IP," Aug. 27, 2018, pp. 1-8, Proc. of the 28th Annual International Conference on Field Programmable Logic & Applications, https://fpl2018.org/venue-trinity-college-dublin/.

* cited by examiner

*Primary Examiner* — Sun J Lin
(74) *Attorney, Agent, or Firm* — Crawford Maunu PLLC

(57) ABSTRACT

A circuit design tool places a circuit design, and after placing detects a hold violation of a path between a first flip-flop on a first IC die and a second flip-flop on a second IC die. The circuit design tool selects a window size based on an amount of the hold violation and determines an alternative path having a delay that resolves the hold violation. The alternative path is restricted to resources within an area of the window size on the second IC die. The circuit design tool replicates a plurality of instances of the alternative path in a plurality of areas of the second IC die and then routes the circuit design using the plurality of instances of the alternative path.

20 Claims, 6 Drawing Sheets

RESOLVING TIMING VIOLATIONS IN MULTI-DIE CIRCUIT DESIGNS

TECHNICAL FIELD

The disclosure generally relates to resolving timing violations in circuit designs targeted to multi-die electronic devices.

BACKGROUND

Satisfying timing constraints and resolving timing violations can be more complex for implementing circuit designs on multi-die electronic devices as compared to implementing designs on monolithic dice. In a multi-die device, multiple semiconductor die can be mounted on and interconnected through a silicon interposer. In some devices, the semiconductor dice can be nearly identical instances of a particular die. Exemplary devices include the ZYNQ® UltraScale+™ family of devices from XILINX, Inc.

In some multi-die devices, each die has multiple columns of programmable logic and interconnect circuitry, and each column can have multiple clock regions. The clock skew of a path can increase with increasing distances of launching and latching flip-flops from the clock driver of a clock region. Also, paths having latching flip-flops at the edge of a die can have the worst hold violations.

For a monolithic semiconductor die, it may be assumed that the flip-flops and signal wires are from the same process and temperature corner, and the range between the minimum and maximum delays is what one expects to see at the same corner. In multi-die devices, each die may result from a different process corner, causing a significant increase in clock skew between launching and latching flip-flops. Though the delay between flip-flops disposed in different dice is greater than the delay between neighboring flip-flops in the same die, significantly more hold violations can occur if flip-flops are placed in neighboring dice than in the same die, because the hold slack depends on the location of the connection between the dice. That is, if the dice are arranged side-by-side, and inter-die signal lines extend in a y-dimension of the stack, the hold slack of a path at one location on the x-dimension of the dice can vary significantly from the slack of a path distant from that location in the x-dimension.

SUMMARY

According to a disclosed method, a circuit design tool executing on a computer processor places a circuit design, and after placing, the circuit design tool detects a hold violation of a path between a first flip-flop on a first IC die and a second flip-flop on a second IC die. The circuit design tool selects a window size based on an amount of the hold violation and determines an alternative path having a delay that resolves the hold violation. The alternative path is restricted to resources within an area of the window size on the second IC die. The circuit design tool replicates a plurality of instances of the alternative path in a plurality of areas of the second IC die and then routes the circuit design using the plurality of instances of the alternative path.

A disclosed system includes a computer processor circuit and a memory arrangement coupled to the computer processor circuit. The memory arrangement is configured with instructions that when executed by the computer processor circuit cause the computer processor circuit to place a circuit design, and after placing, detect a hold violation of a path between a first flip-flop on a first IC die and a second flip-flop on a second IC die. The instructions further cause the processor circuit to select a window size based on an amount of the hold violation and determine an alternative path having a delay that resolves the hold violation. The alternative path is restricted to resources within an area of the window size on the second IC die. In executing the instructions, the computer processor circuit replicates a plurality of instances of the alternative path in a plurality of areas of the second IC die and then routes the circuit design using the plurality of instances of the alternative path.

Other features will be recognized from consideration of the Detailed Description and Claims, which follow.

BRIEF DESCRIPTION OF THE DRAWINGS

Various aspects and features of the methods and system will become apparent upon review of the following detailed description and upon reference to the drawings in which.

DETAILED DESCRIPTION

Figure 1:
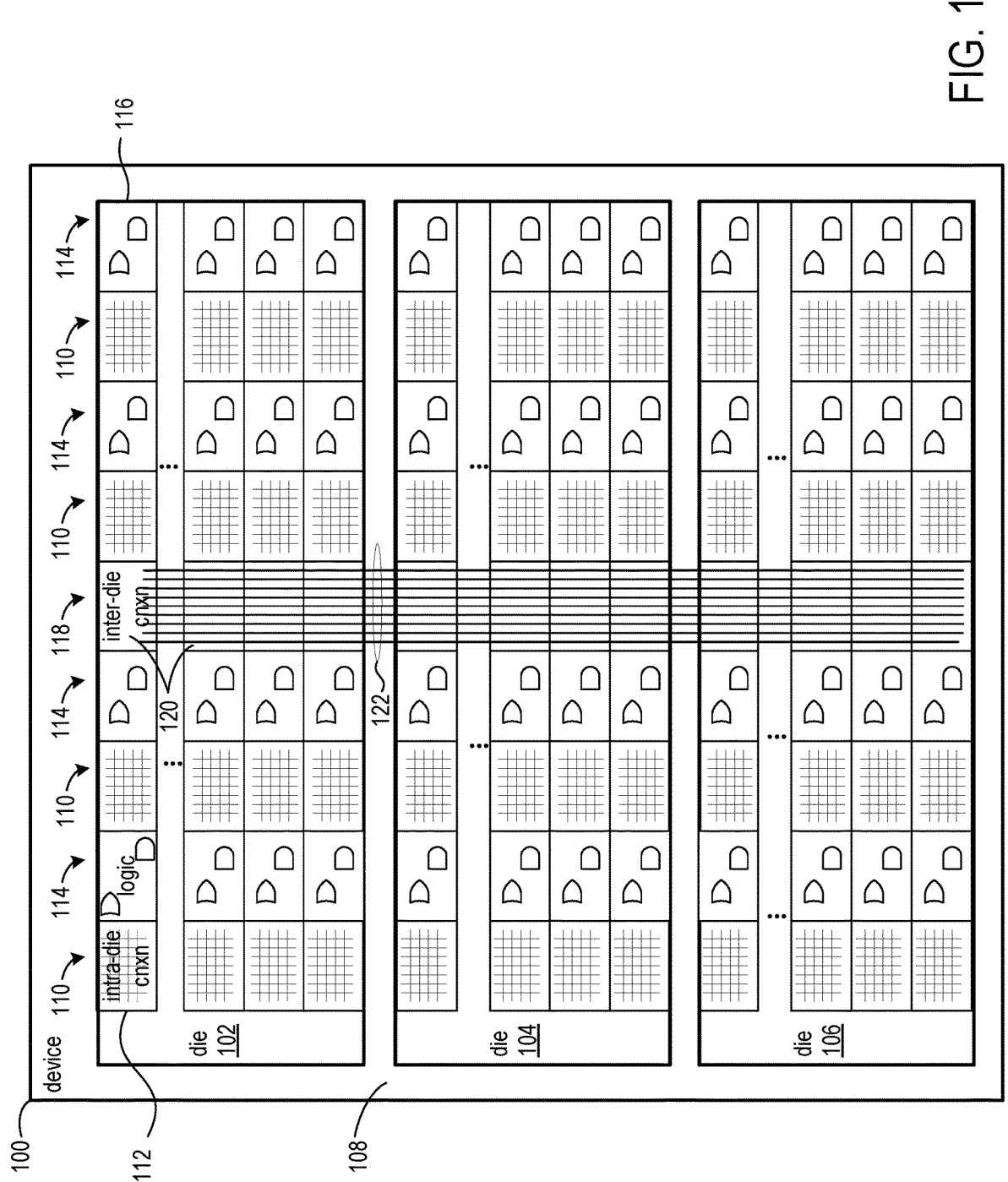
FIG. 1 shows an exemplary electronic device having multiple semiconductor dice disposed on a silicon substrate.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches offer improved solutions for resolving hold violations and satisfying timing constraints in circuit designs targeted to multi-die devices. The approaches offer fast run-times in place-and-route processes, thereby improving the performance of computer systems. In addition to improving computer performance, the disclosed approaches resolve all inter-die hold violations while maximizing the achievable frequency of the circuit design, confine the resources used to resolve hold violations to the smallest possible areas of the dice, limit the quantity of resources devoted to the solution, and produce suitable solutions for different inter-die channels that are applicable to different levels of inter-die channel utilization and signal direction.

In one approach, a circuit design tool initially places and routes a circuit design, and through timing analysis detects a hold violation on a path between flip-flops on different dice of a target device. Based on the hold slack that quantifies the hold violation, the circuit design tool selects a size of a window in which circuit resources of a die can be allocated to resolve the hold violation. Using the resources within an area limited by the window size, the circuit design tool determines an alternative path that has a delay sufficient to resolve the hold violation of the path. The circuit design tool replicates multiple instances of the alternative path in the circuit design within respective areas of one or more dice of the target device. The areas in which the instances are replicated are bound by the window overlaid on the die at various locations. The replication of the instances of the alternative path reserves the die resources and resolves the hold violations in redoing the placing and routing of the circuit design.

Additional technical features and improvements in performance of the circuit design, as implemented on the target device and computer performance in executing the design tool, will become apparent in the following description of the drawings.

FIG. 1 shows an exemplary electronic device 100 having multiple semiconductor dice 102, 104, 106 disposed on a silicon substrate 108. Though the exemplary device is shown as having three dice, the disclosed approaches are applicable to devices having two or more dice.

Each die 102, 104, 106 of the exemplary device 100 has columns 110 of programmable intra-die connection tiles 112, and columns 114 of programmable logic tiles 116. Each die further includes a column 118 having inter-die connection tiles 120 through which signals are routed between dice. Actual programmable IC dice can have many more columns of programmable intra-die connection and programmable logic tiles, as well as additional columns of inter-die connection tiles, and the disclosed approaches are applicable thereto. Moreover, actual programmable IC dice may include columns having both programmable logic tiles and inter-die connection tiles. The inter-die connection tiles can be located at the bottom or top of a column in order to simplify layout of signal lines in the interposer. The dice may further include digital signal processing tiles, input/output tiles, memory blocks etc.

Figure 3:
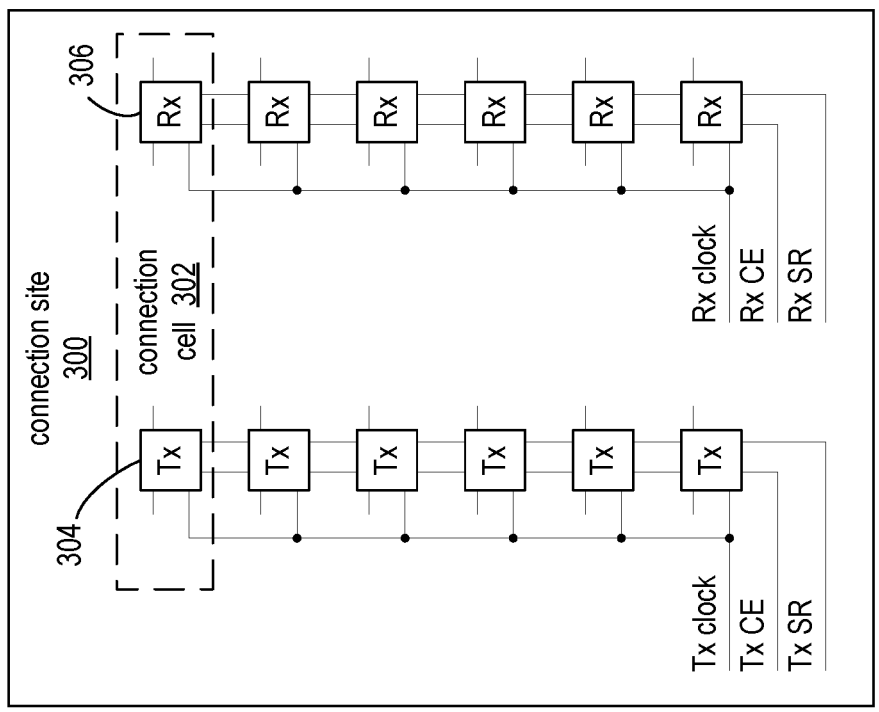
FIG. 3 shows an exemplary connection site of an inter-die connection tile.
Figure 2:
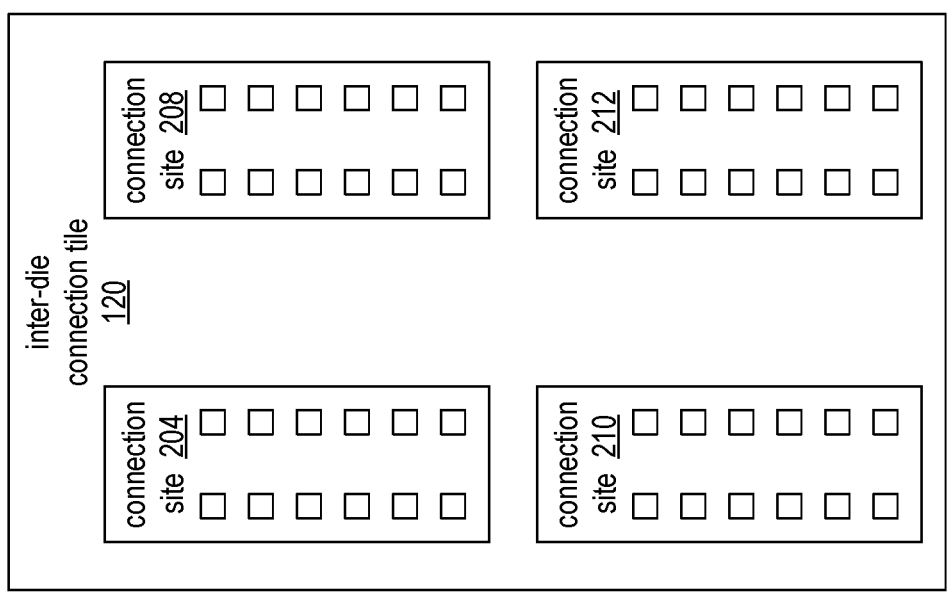
FIG. 2 shows an exemplary inter-die connection tile.

Based on a circuit design, the intra-die connection tiles 112 are programmable to create signal paths between selected circuit elements on a die, and the programmable logic tiles 116 are programmable to create logic functions. The inter-die connection tiles 120 are programmable to create signal paths between circuit elements on different ones of the dice. The lines 122 illustrate the signal lines for carrying inter-die signals according to an implemented circuit design. Though only 9 inter-die signal lines are shown, an actual device would have many more inter-die signals lines, as can be seen in FIGS. 2 and 3. The inter-die signal lines provide for direct connections between two dice. In some applications, the connections are only between adjacent dice. In other applications, connections may be provided between non-adjacent dice.

The dice 102, 104, and 106 are arranged side-by-side in a stacked arrangement on the silicon substrate. Stacking the dice, such as field programmable gate arrays (FPGAs), enables manufacture of large capacity devices by assembling multiple, better yielding, smaller dies on a silicon interposer manufactured in a more mature process node.

In an exemplary device, the dice are identical to one another, though the disclosed approaches are applicable to dissimilar die. Each die can be structured to include multiple clock regions (not shown), and each clock region can include multiple columns 110 of intra-die connection tiles and multiple columns 114 of programmable logic tiles. Two or more columns 118 of inter-die connection tiles can be provided for each clock region. For purposes of illustration only, the height of each column 110 and 114 can be 60 intra-die connection tiles 112.

FIG. 2 shows an exemplary inter-die connection tile 120. The inter-die connection tiles provide connectivity between dice through signal lines (not shown) that connect to transmit flip-flops or receive flip-flops within connection sites 204, 208, 210, and 212. In an exemplary die, each inter-die connection tile can contain four connection sites, each site having six bi-directional inter-die connection lines.

FIG. 3 shows an exemplary connection site 300 of an inter-die connection tile. The connection site 300 includes multiple connection cells. Each connection cell includes a transmit flip-flop and a receive flip-flop. For example, connection cell 302 includes transmit flip-flop 304 and receive flip-flop 306. Each connection cell is paired with one and only one connection cell of an inter-die connection tile on a different die. The output of the transmit flip-flop and the input of the receive flip-flop of a connection cell connect to the same inter-die signal line.

The transmit flip-flops in a connection site are controlled by shared Tx clock, Tx CE and Tx SR signals, and the receive flip-flops are controlled by shared Rx clock, Rx CE and Rx SR signals. The data input signal to each transmit flip-flop can be connected to a signal generated from logic on the same die as that of the inter-die connection tile. Likewise, the data output signal from each receive flip-flop can be connected to logic on the same die as that of the inter-die connection tile.

Each of the inter-die signal lines can span the number of tiles in the columns of inter-die connection tiles of the stacked die. Thus, a device having a total of 60 inter-die connection tiles in a column that spans the stacked dice, can have 1440 inter-die signal lines (60 tiles*4 connection sites/inter-die connection tile*6 inter-die signal lines/connection site) for each column of inter-die connection tiles.

Figure 4:
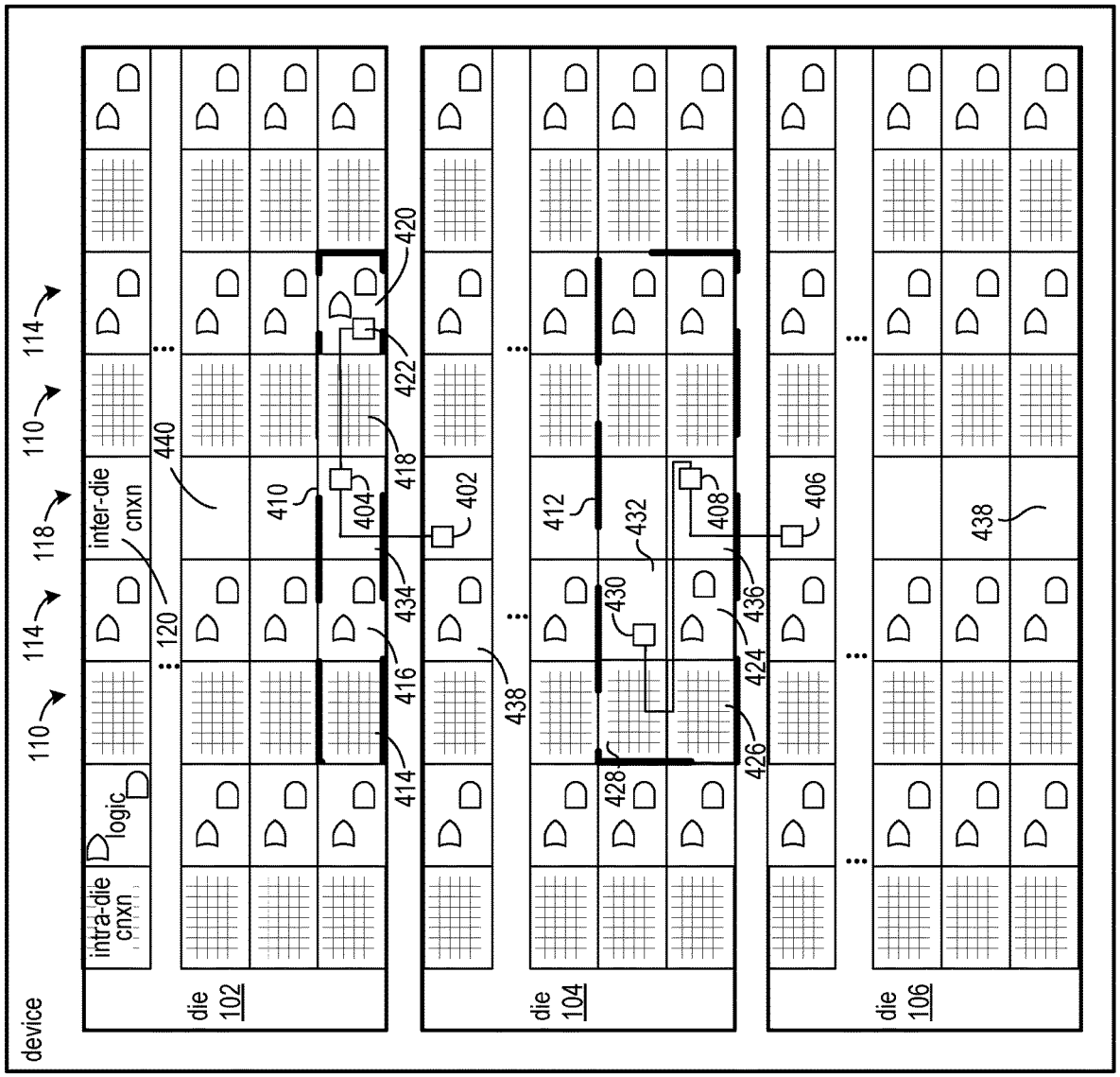
FIG. 4 shows examples of two paths having hold violations and alternative detour paths determined for two different window sizes.

FIG. 4 shows examples of two paths having hold violations and alternative detour paths determined for two different window sizes. In some applications, a die can have multiple inter-die connection regions, and each inter-die connection region can include a portion of the inter-die connection tiles in a column on the die. For example, a die could have a top inter-die connection region and a bottom inter-die connection region. Within a particular inter-die connection region, the same window size can be used because the hold violations will have a similar hold slack. Different window sizes may be used in different inter-die connection regions if the inter-die connection regions have different hold slacks. Different inter-die connection regions can have different hold slacks because different dice are involved. For example, the bottom inter-die connection region of die 102 provides connections to the top inter-die connection region in die 104, and the bottom inter-die connection region in die 104 provides connections to the top inter-die connection region of die 106.

After a circuit design tool has initially placed and routed a circuit design, the circuit design tool can detect hold violations on paths between flip-flops on different dice of a target device through static timing analysis. The path from launching flip-flop 402 on die 104 to latching flip-flop 404 on die 102 is one example of a path having a hold violation, and the path from launching flip-flop 406 on die 106 to latching flip-flop 408 on die 104 is another example of a path having a hold violation. Though only a single path is shown as having a hold violation in each of inter-die connection tiles 434 and 436, there can be multiple paths having hold violations in each of the inter-die connection tiles. For example, timing violations can be detected in paths between inter-die connection tile 438 of die 106 and inter-die connection tile 440 of die 102.

The disclosed approaches use to advantage a characteristic of the target device 100 (FIG. 1). In a given column 118 (FIG. 1) of inter-die connection tiles 120 (FIG. 1) and corresponding inter-die signal lines 122 (FIG. 1), which together can be referred to as an inter-die channel, the hold violations on paths of the same direction for pairs of transmit and receive flip-flops are approximately equal. Thus, the alternative path constructed to resolve the hold violation of one path can be replicated to resolve hold violations on other paths through other inter-dice connection tiles.

The design tool determines alternative paths having delays that are sufficient to fix the hold violations present on paths in an inter-die connection tile 120. Each alternative path is constructed within the boundaries of a window having a size that is dependent on the hold violations of the paths in an inter-die connection tile. Generally, a larger hold violation (e.g., exhibited by a more negative hold slack value) involves a larger window size to construct the alternative path.

In order to avoid contention with other parts of the circuit design for circuit resources of a die, the size of the window in which circuit resources used to construct an alternative path is selected to be as small as possible to fix the hold violation. In an exemplary implementation, the width of the window can be fixed to include the nearest columns 110 of intra-die connection tiles and nearest columns 114 of programmable logic tiles on either side of the inter-die connection column 118. The height of the window can be increased to encompass more circuit resources that can be included in a path to introduce additional delay. For example, window 410 has a height of one tile, and window 412 has a height of two tiles.

In constructing an alternative path, the design tool considers the resources within an area of a chosen window size. To fix the hold violation of the path involving flip-flops 402 and 404, the circuit resources within the tiles of an area bounded by window 410 are considered. That is, circuit resources within tiles 414, 416, 418, and 420 are surveyed. The path involving flip-flops 406 and 408 may have a greater hold violation than the path involving flip-flops 402 and 404, and therefore, a larger window 412, which has a height of two tiles, can be used to resolve the hold violation.

The alternative path constructed to resolve the hold violation involving flip-flops 402 and 404 uses circuit resources, such as additional routing wires in tile 418 and a flip-flop 422 in tile 420. The alternative path constructed to resolve the hold violation involving flip-flops 406 and 408 uses circuit resources, such as possibly a look-up table (not shown) in tile 424, additional routing wires in tiles 426 and 428, and a flip-flop 430 in tile 432.

The examples of FIG. 4 shows construction of the alternative path on the receiving ends of the paths. In an alternative approach, the alternative path could be constructed on the transmitting ends of the paths. For example, instead of detouring the path through receiving flip-flop 404 to flip-flop 422, an alternative detour path could begin with a flip-flop (not shown) in tile 438 and pass through transmitting flip-flop 402.

Figure 5:
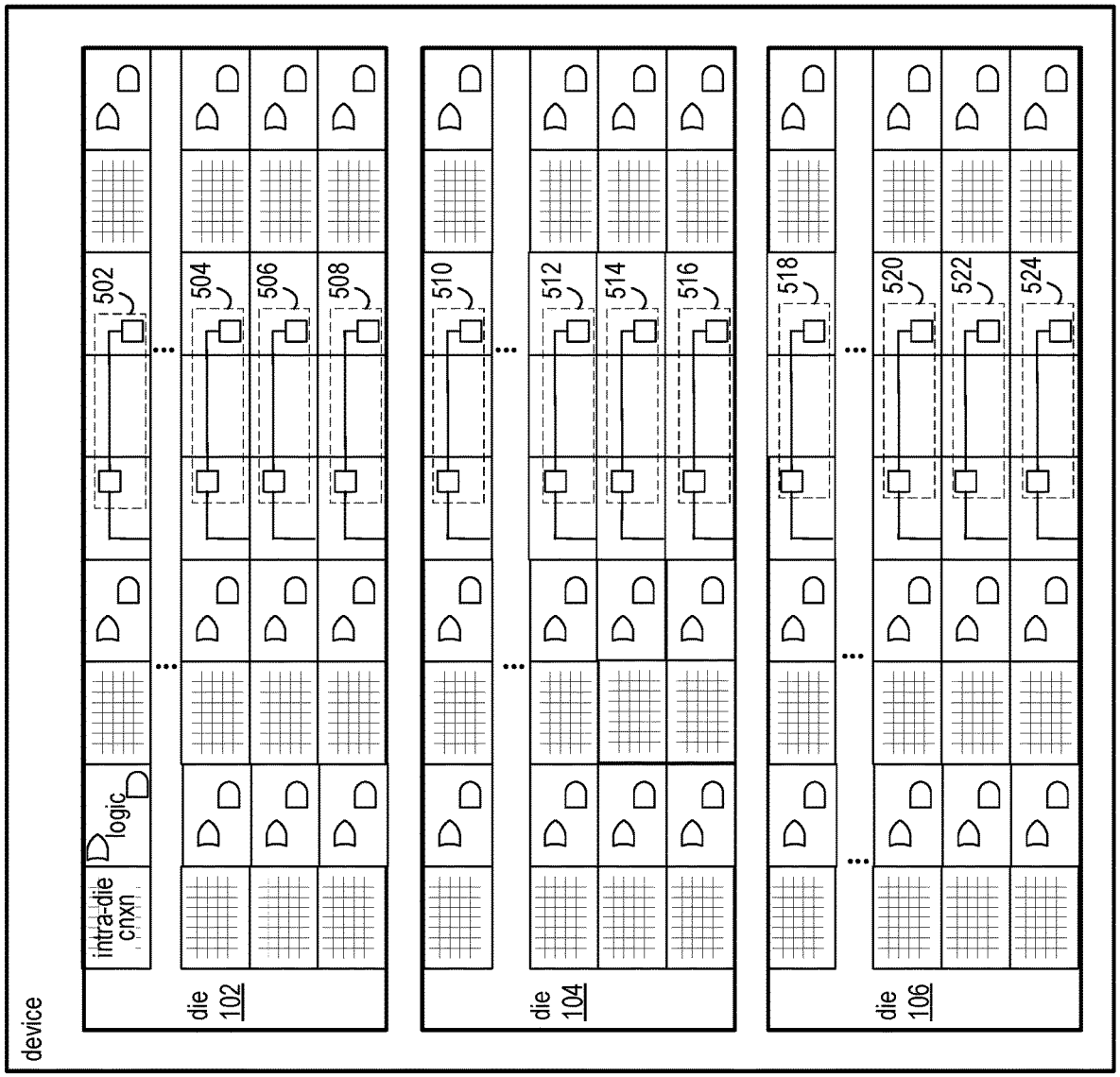
FIG. 5 shows an exemplary target device in which an alternative detour path has been replicated in multiple areas of the dice.

In order to resolve hold violations present on multiple paths having transmit and receive flip-flops in different ones of the inter-die connection tiles, and do so in a manner that reduces computation time, the selected alternative path is replicated for multiple areas of each die, as can be seen in the example of FIG. 5. Thus, the possible window sizes considered in constructing alternative paths are based on an evenly dividing the number of inter-die connection tiles in a column on a die. That is, the number of inter-die connection tiles in a column of each die is evenly divisible by the height of a window.

Though the example of FIG. 4 involves a path from transmit flip-flop 402 in die 104 to receive flip-flop 404 in die 102 and a path from transmit flip-flop 406 in die 106 to receive flip-flop 408 in die 104, paths involving signals driven in the opposite direction can have hold violations, depending on particularities of the circuit design. That is, signal paths having transmit flip-flops in die 102 and receive flip-flops in die 104, and signal paths having transmit flip-flops in die 104 and receive flip-flops in die 106 can have hold violations. For ease of exposition, paths from die 106 to dice 104 and 102 and from die 104 to die 102 are referenced as "northbound" paths, and paths from die 102 to dice 104 and 106 and from die 104 to die 106 are referenced as "southbound" paths. Alternative detour paths are constructed for southbound paths in a manner similar to that described above for northbound paths. A different solution can be computed for southbound paths versus northbound paths because the clock skew of northbound paths can be different from the clock skew of southbound paths. Also, different window sizes may be used for southbound versus northbound paths.

FIG. 5 shows an exemplary target device in which an alternative detour path has been replicated in multiple areas of the dice 102, 104, and 106. The paths 502, 504, 506, 508, 510, 512, 514, 516, 518, 520, 522, and 524 in FIG. 5 are instances of the alternative detour path constructed for the path having transmit flip-flop 402 and receive flip-flop 404 shown in FIG. 4. In an alternative approach, the alternative detour path could be constructed within an area on the transmitting die rather than the receiving die, and instances of that path can be replicated in areas of the transmitting die. The instances of the alternative path are confined to areas of a window having a height of one tile, which corresponds to the window 410 of FIG. 4

Though FIG. 5 shows the replicated instances of only one alternative path for each inter-die connection tile, it will be recognized that instances of other alternative paths would also be replicated for alternative paths through the inter-die connection tiles. That is, multiple paths involving a single inter-die connection tile can have hold violations, and respective alternative paths can be constructed for those paths. The design tool can replicate instances of those respective alternative paths in areas of the dice consistent with the selected window.

The instances of the replicated path shown in FIG. 5 are for northbound signal paths. Though not shown, it will be appreciated that instances of other replicated paths can be instantiated for southbound signal paths.

Figure 6:
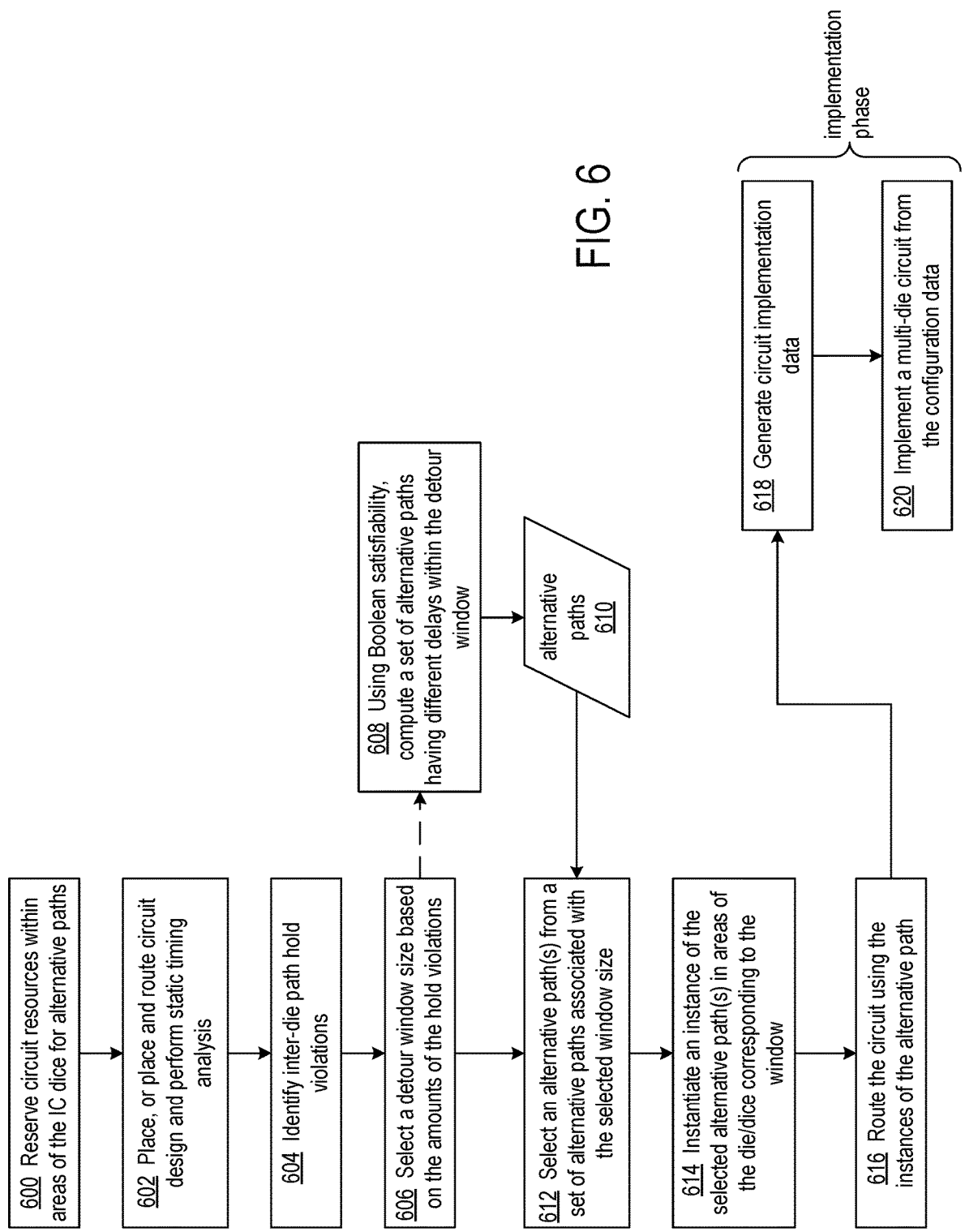
FIG. 6 shows a flowchart of an exemplary process of processing a circuit design.

FIG. 6 shows a flowchart of an exemplary approach for processing a circuit design. The process assumes that the circuit design has been synthesized. At block 600, the process reserves circuit resources within areas of the target IC dice for constructing alternative paths. The reserved areas are the columns of tiles (or partial columns) of the dice in which the inter-die connection tiles, logic tiles, and intra-die connection tiles have circuit resources for the alternative paths according to a selected window size.

At block 602, a circuit design tool places, or both places and routes a circuit design and then performs static timing analysis. In placing, or placing and routing, the circuit design tool avoids assigning circuit resources within the reserved areas of the dice to implement elements of the circuit design. The circuit design tool identifies inter-die paths having hold violations at block 604.

At block 606, the circuit design tool selects a window size based on the amounts of the hold violations of the inter-die paths. The circuit design tool can be programmed to select the window size based on ranges of hold slack values associated with different window sizes. The largest hold violation of an inter-die path on a channel can be used to select one of the window sizes. In order to limit the circuit resource used to resolve the hold violations, the design tool selects the smallest window size that can resolve the hold violations.

At block 608, the circuit design tool computes and stores alternative detour paths 610. The alternative detour paths can be computed using a Boolean satisfiability algorithm ("SAT-based routing"). In SAT-based routing, the problem of routing nets involves determining variable assignments that satisfy a set of Boolean constraints that define a legal placement, routing, and timing.

The alternative detour paths can be pre-computed. That is, the alternative paths can be computed prior to placing and routing the circuit design and stored for use in placing and routing any circuit design. During the place-and-route process, the circuit design tool can look-up the set of alternative paths (or "solution") that resolve the hold violations. Looking-up the solution instead of computing the solution during place-and-route significantly reduces computing resources required for place-and-route. SAT-based routing simultaneously handles both setup and hold constraints, and in the exemplary application fully explores the possible solutions within the different window sizes.

The pre-computed solutions can include respective sets of paths for different window sizes. For example, one solution can include a set of paths in which each path is limited to resources in a window height 1 tile, another solution can include a set of paths in which each path is limited to resources in a window height of 2 tiles, another solution can include a set of paths in which each path is limited to resources in a window height of 4 tiles, etc. The alternative paths in the different sets have different delays for resolving different amounts of hold violations. For example, the delays of the alternative paths associated with a window having a height of 1 tile provide less delay than the alternative paths associated with a window having a height of 2 tile.

For the maximal/worst case, every possible inter-die path through an inter-die connection tile has a hold violation. Referring to the inter-die connection tile 120 of FIG. 2, for example, the paths through all 6 transmit-receive flip-flop pairs in all 4 connection sites 204, 208, 210, and 212 can have a hold violation in the maximal case. Thus, each solution to the maximal case would have 24 alternative detour paths.

At block 612, the circuit design tool selects one or more alternative detour paths from the set of alternative paths in the selected window size. The number of alternative paths chosen is based on the greatest number of hold violations of paths through any one of the inter-die connection tiles in a column. If M is the greatest number of hold violations of paths through the inter-die connection tiles in a column, any M alternative paths can be selected from the solution set.

The circuit design tool replicates instances of the selected alternative detour path(s) at block 614. The instances of the alternative detour path(s) are placed in areas of the die/dice that correspond to the selected window size. For example, FIG. 5 shows areas having a height of one tile in the dice 102, 104, and 106 in which instances of the alternative path constructed within the window 410 of FIG. 4 have been instantiated.

In a device in which the hold slacks of south-to-north ("northbound") inter-die paths are nearly equal to the hold slacks of north-to-south ("southbound") inter-die paths, instances of the selected alternative path can be replicated on all each having receive flip-flops of inter-die paths. If the difference between hold slacks on southbound paths and northbound paths is so great that the alternative paths for northbound paths would not resolve the hold violations for southbound paths (or vice versa), the processing of blocks 606, 612, and 614 can be repeated for southbound paths.

At block 616, the circuit design tool routes the circuit design using the instances of the alternative path(s). If the circuit design was previously routed at block 602, the design tool partially reroutes the circuit design using the instances of the alternative path(s). In an implementation phase, the circuit design tool can generate circuit implementation data at block 618 after redoing the placing and routing. Generating the circuit implementation data can include generating configuration data for a programmable device having multiple integrated circuit dice or generating data for fabricating an application-specific (ASIC). At block 620, a circuit can be implemented by way of configuring a programmable IC with the configuration data or fabricating, making, or producing an ASIC from the circuit implementation data, thereby creating a circuit that operates according to the circuit design.

Figure 7:
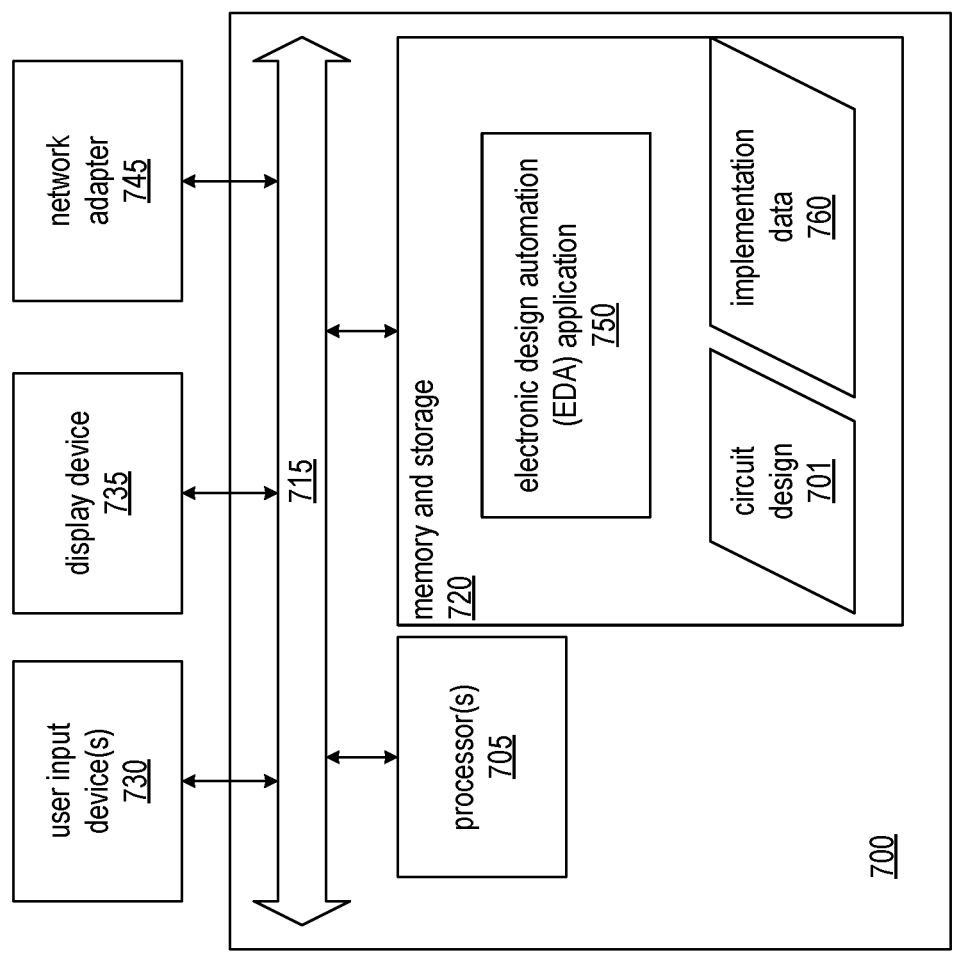
FIG. 7 is a block diagram illustrating an exemplary data processing system.

FIG. 7 is a block diagram illustrating an exemplary data processing system (system) 700 specifically programmed according to the disclosed processes. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 701 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750, which may alternatively be referred to as a design tool. EDA application 750, being implemented in the form of executable program code, is executed by processor(s) 705. As such, EDA application 750 is considered part of system 700. System 700, while executing EDA application 750, receives and operates on circuit design 701. In one aspect, system 700 performs a design flow on circuit design 701, and the design flow may include synthesis, mapping, placement, routing, and the generation of circuit implementation data 760.

EDA application 750, circuit design 701, circuit implementation data 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for processing circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:
    placing a circuit design by a circuit design tool executing on a computer processor;
    detecting, by the circuit design tool after the placing of the circuit design, a hold violation of a path between a first flip-flop on a first integrated circuit (IC) die and a second flip-flop on a second IC die;
    selecting, by the circuit design tool, a window size based on an amount of the hold violation;
    determining, by the circuit design tool, an alternative path having a delay that resolves the hold violation and is restricted to resources within an area of the window size on the second IC die;
    replicating a plurality of instances of the alternative path in a plurality of areas of the second IC die by the circuit design tool; and
    routing the circuit design by the circuit design tool using the plurality of instances of the alternative path.

2. The method of claim 1, wherein the determining the alternative path includes:
    generating a plurality of alternative paths before placing the circuit design, each alternative path of the plurality of alternative paths restricted to resources within an area of a different window size on the second IC die, and the alternative paths of the different window sizes having different delays for resolving different amounts of hold violations; and
    selecting one alternative path of the plurality of alternative paths to resolve the hold violation, the one alternative path having a least delay of the delays of ones of the plurality of alternative paths that resolve the hold violation.

3. The method of claim 1, further comprising replicating instances of the alternative path in areas of the first IC die.

4. The method of claim 1, wherein the detecting the hold violation includes detecting the hold violation in a path having the first flip-flop configured to output a data signal that is input to the second flip-flop.

5. The method of claim 1, wherein the detecting the hold violation includes detecting the hold violation in a path having the second flip-flop configured to output a data signal that is input to the first flip-flop.

6. The method of claim 1, wherein the determining the alternative path includes:
    generating a plurality of alternative paths before placing the circuit design, each alternative path of the plurality of alternative paths restricted to resources within an area of a different window size of a plurality of different window sizes on the second IC die, each window size associated with multiple alternative paths, and the alternative paths associated with each window size being suitable for resolving an amount of hold violation that is different from an amount of hold violation that the alternative paths associated with each of the other window sizes are suitable to resolve;
    selecting one window size of the plurality of window sizes to resolve the hold violation, the one window size having one or more associated alternative paths having a delay that resolves the hold violation, and the alternative paths associated with the one window size having delays that are less than the delays of alternative paths associated with others of the window sizes that resolve the hold violation; and
    selecting one alternative path associated with the one window size to resolve the hold violation, the one alternative path having a least delay of the delays of ones of the alternative paths associated with the one window size.

7. The method of claim 1, wherein the determining the alternative path includes:
    generating a plurality of alternative paths using Boolean satisfiability to determine routes of the plurality of alternative paths before placing the circuit design, each alternative path of the plurality of alternative paths restricted to resources within an area of a different window size on the second IC die, and the alternative paths of the different window sizes having different delays for resolving different amounts of hold violations; and
    selecting one alternative path of the plurality of alternative paths to resolve the hold violation, the one alternative path having a least delay of the delays of ones of the plurality of alternative paths that resolve the hold violation.

8. The method of claim 1, wherein:
    the detecting includes detecting a plurality of hold violations of a plurality of paths between a plurality of first flip-flops on the first IC die between a plurality of second flip-flops on the second IC die;
    the determining includes determining a plurality of alternative paths having delays that resolve the plurality of hold violations and that are restricted to the resources within the area of the window size on the second die; and the replicating includes replicating instances of the plurality of alternative paths in the plurality of areas of the second IC die.

9. The method of claim 1, wherein:
the second IC die includes an array of tiles that includes columns of programmable logic tiles, columns of programmable interconnect tiles, and at least one column having N inter-die connection tiles; and
the selecting the window size includes selecting a height of the window size to be a number, H, of inter-die connection tiles in the at least one column of inter-die connection tiles, such that N is evenly divisible by H.

10. The method of claim 1, further comprising:
generating circuit implementation data after the routing; and
making an integrated circuit from the circuit implementation data.

11. A system, comprising:
a computer processor circuit;
a memory arrangement coupled to the computer processor circuit and configured with instructions that, when executed by the computer processor circuit, cause the computer processor circuit to:
place a circuit design;
detect, after placement of the circuit design, a hold violation of a path between a first flip-flop on a first integrated circuit (ICI die and a second flip-flop on a second IC die;
select a window size based on an amount of the hold violation;
determine an alternative path having a delay that resolves the hold violation and is restricted to resources within an area of the window size on the second IC die;
replicate a plurality of instances of the alternative path in a plurality of areas of the second IC die; and
route the circuit design using the plurality of instances of the alternative path.

12. The system of claim 11, wherein the instructions that determine the alternative path include instructions that cause the computer processor circuit to:
generate a plurality of alternative paths before placing the circuit design, each alternative path of the plurality of alternative paths restricted to resources within an area of a different window size on the second IC die, and the alternative paths of the different window sizes having different delays for resolving different amounts of hold violations; and
select one alternative path of the plurality of alternative paths to resolve the hold violation, the one alternative path having a least delay of the delays of ones of the plurality of alternative paths that resolve the hold violation.

13. The system of claim 11, wherein the memory is further configured with instructions that cause the computer processor circuit to replicate instances of the alternative path in areas of the first IC die.

14. The system of claim 11, wherein the instructions that detect the hold violation include instructions that cause the computer processor circuit to detect the hold violation in a path having the first flip-flop configured to output a data signal that is input to the second flip-flop.

15. The system of claim 11, wherein the instructions that detect the hold violation include instructions that cause the computer processor circuit to detect the hold violation in a path having the second flip-flop configured to output a data signal that is input to the first flip-flop.

16. The system of claim 11, wherein the instructions that determine the alternative path include instructions that cause the computer processor circuit to:
generate a plurality of alternative paths before placing the circuit design, each alternative path of the plurality of alternative paths restricted to resources within an area of a different window size of a plurality of different window sizes on the second IC die, each window size associated with multiple alternative paths, and the alternative paths associated with each window size being suitable for resolving an amount of hold violation that is different from an amount of hold violation that the alternative paths associated with each of the other window sizes are suitable to resolve;
select one window size of the plurality of window sizes to resolve the hold violation, the one window size having one or more associated alternative paths having a delay that resolves the hold violation, and the alternative paths associated with the one window size having delays that are less than the delays of alternative paths associated with others of the window sizes that resolve the hold violation; and
select one alternative path associated with the one window size to resolve the hold violation, the one alternative path having a least delay of the delays of ones of the alternative paths associated with the one window size.

17. The system of claim 11, wherein the instructions that determine the alternative path include instructions that cause the computer processor circuit to:
generate a plurality of alternative paths using Boolean satisfiability to determine routes of the plurality of alternative paths before placing the circuit design, each alternative path of the plurality of alternative paths restricted to resources within an area of a different window size on the second IC die, and the alternative paths of the different window sizes having different delays for resolving different amounts of hold violations; and
select one alternative path of the plurality of alternative paths to resolve the hold violation, the one alternative path having a least delay of the delays of ones of the plurality of alternative paths that resolve the hold violation.

18. The system of claim 11, wherein:
the instructions that detect include instructions that cause the computer processor circuit to detect a plurality of hold violations of a plurality of paths between a plurality of first flip-flops on the first IC die between a plurality of second flip-flops on the second IC die;
the instructions that determine include instructions that cause the computer processor circuit to determine a plurality of alternative paths having delays that resolve the plurality of hold violations and that are restricted to the resources within the area of the window size on the second die; and
the instructions that replicate include instructions that cause the computer processor circuit to replicate instances of the plurality of alternative paths in the plurality of areas of the second IC die.

19. The system of claim 11, wherein:
the second IC die includes an array of tiles that includes columns of programmable logic tiles, columns of programmable interconnect tiles, and at least one column having N inter-die connection tiles; and
the instructions that select the window size include instructions that cause the computer processor circuit to select a height of the window size to be a number, H, of inter-die connection tiles in the at least one column of inter-die connection tiles, such that N is evenly divisible by H.

20. The system of claim 11, wherein the memory is further configured with instructions that cause the computer processor circuit to:

generating circuit implementation data after the routing; and configure a programmable device with the circuit implementation data.

* * * * *